US008224791B2

(12) United States Patent
Rieger (10) Patent No.: US 8,224,791 B2
(45) Date of Patent: Jul. 17, 2012

(54) INFORMATION LIFECYCLE CROSS-SYSTEM RECONCILIATION

(75) Inventor: Lothar Rieger, Bammental (DE)

(73) Assignee: SAP AG, Walldorf (DE)

( * ) Notice: Subject to any disclaimer, the term of this patent is extended or adjusted under 35 U.S.C. 154(b) by 221 days.

(21) Appl. No.: 12/557,542

(22) Filed: Sep. 11, 2009

(65) Prior Publication Data

US 2011/0066601 A1   Mar. 17, 2011

(51) Int. Cl.
*G06F 7/00* (2006.01)
*G06F 17/00* (2006.01)

(52) U.S. Cl. . 707/690; 707/756; 707/802; 707/E17.044; 705/14.17; 705/14.18; 705/39

(58) Field of Classification Search ............. 707/690, 707/756, 802, E17.044; 705/14.17, 14.18, 705/68, 17, 21, 39
See application file for complete search history.

(56) References Cited

U.S. PATENT DOCUMENTS

| | | | | |
|---|---|---|---|---|
| 6,411,936 | B1* | 6/2002 | Sanders | 705/7.32 |
| 7,254,555 | B2* | 8/2007 | Field | 705/2 |
| 7,885,889 | B2* | 2/2011 | Oppenheimer et al. | 705/38 |
| 2002/0099563 | A1* | 7/2002 | Adendorff et al. | 705/1 |
| 2003/0145205 | A1* | 7/2003 | Sarcanin | 705/67 |
| 2003/0233292 | A1* | 12/2003 | Richey et al. | 705/28 |
| 2005/0197896 | A1* | 9/2005 | Veit et al. | 705/14 |
| 2005/0222931 | A1* | 10/2005 | Mamou et al. | 705/35 |
| 2006/0229896 | A1* | 10/2006 | Rosen et al. | 705/1 |
| 2007/0011205 | A1* | 1/2007 | Majjasie et al. | 707/104.1 |
| 2007/0220027 | A1* | 9/2007 | Richey et al. | 707/101 |
| 2009/0048883 | A1* | 2/2009 | Kelly et al. | 705/7 |
| 2009/0204517 | A1* | 8/2009 | Edens et al. | 705/30 |
| 2010/0153239 | A1* | 6/2010 | Liebich et al. | 705/30 |
| 2011/0066601 | A1* | 3/2011 | Rieger | 707/690 |
| 2011/0106858 | A1* | 5/2011 | Rieger | 707/805 |

OTHER PUBLICATIONS

Eckert, Roland and Specht, Günther (2004)—"Transformation Report: The missing Standard for Data Exchange"—In: Proc. 6th NASA-ESA Workshop on Product Data Exchange (PDE 04), Friedrichshafen, Germany—Apr. 20-23, 2004 (pp. 1-7).*
Qi Yu, Xumin Liu, Athman Bouguettaya and Brahim Medjahed—"Deploying and managing Web services: issues, solutions, and directions"—The VLDB Journal, vol. 17, No. 3, Apr. 19, 2006, (pp. 537-572).*

* cited by examiner

*Primary Examiner* — Shahid Alam
*Assistant Examiner* — Anh Ly (57) ABSTRACT

In the described systems and methods for information lifecycle cross-system reconciliation, a number of reconciliation indicators for a certain type of data are defined. A first set of values of the reconciliation indicators are calculated at a first computer system based on data stored in a memory of the first computer system. A second set of values of the reconciliation indicators are calculated at a second computer system based on data transferred from the first computer system. The two sets of values are received at reconciliation cockpit and stored in a reconciliation data structure. Further, the reconciliation data structure is examined to identify inconsistency between the data stored in the memory of the first computer system and the data transferred to the second computer system. If such an inconsistency is identified, the data transfer is cancelled. If inconsistency is not identified, the data transfer is confirmed.

16 Claims, 6 Drawing Sheets

FIG. 1

| RECONCILIATION DATA STRUCTURE | | | |
|---|---|---|---|
| | Transfer 1 | Transfer 2 | ... |
| Theme | Consolidating Financial Data | Archiving Financial Data | |
| Source System | ERP | ERP | |
| Destination System | Consolidation | Archiving | |
| Date | March, 2009 | December, 2008 | |
| Company | CC01 | CC01 | |
| Reconciliation Indicators | 1. Total BS<br>2. Total AR<br>3. ... | 1. No. Doc<br>2. Total AP<br>3. ... | |
| Result at Source | 1. 1,000<br>2. 400<br>3. ... | 1. 5,000<br>2. 1,500<br>3. ... | |
| Result at Target | 1. 1,000<br>2. 400<br>3. ... | 1. 5,000<br>2. 1,400<br>3. ... | |
| Status | 1. OK<br>2. OK<br>3. ... | 1. OK<br>2. Error<br>3. ... | |

INFORMATION LIFECYCLE CROSS-SYSTEM RECONCILIATION

FIELD OF INVENTION

The field of the invention relates generally to data processing and digital processing systems. More specifically, the invention is related to cross-system data transferring and reconciliation within a multi computer systems environment.

BACKGROUND OF THE INVENTION

One of the tasks in enterprise management is to ensure consistent information lifecycle. The information lifecycle includes various stages of data or metadata processing, starting with creation of data and ending with data disposal. Usually, large enterprises employ a network of computer systems that are integrated in complex system architectures to automate business processes and data management. In such enterprises, a single piece of information is often transferred from one persistency to another between several different applications and systems. Consistent information and data reports are required from the diverse environment of the information during its lifecycle.

For example, financial data is typically created in an enterprise resource planning (ERP) system of a company unit. At an end of a financial period (e.g., end of month) part of the created financial data is transferred into a separate consolidation system where it might be combined with financial data coming from other company units. The data could be used for end-of-period processing for the whole enterprise, and for group reports, for instance. At some later point, the financial data is usually removed from the ERP system and from the consolidation system to be archived into a storage system, according to selected archiving rules.

During its lifecycle, the information has to be consistent and available to users to ensure efficient enterprise management, as well as to satisfy various statutory requirements. For example, there are different financial reports that are generated using data from an ERP system of a company unit. Same data is used in reports generated in a consolidation system. Archive storage systems also provide various reports based on the archived data. There are many factors that could cause inconsistency of the information, e.g., user error, incomplete processing, transaction failure. Therefore, the information is typically audited throughout its lifecycle and in every environment or system where it is persisted. With respect to the financial data lifecycle, enterprises (especially the financial institutions) may be statutorily obligated to provide such verification. Data verification procedures applied in a company are typically subject to external audits.

Data transfers across different systems during the information lifecycle maybe one of the causes of inconsistency. Therefore, data transferred between two computer system environments within enterprise information architecture should be examined before, during and after the transfer. However, verification of a cross systems data transfer can be a burdensome task with little or no automation. One that could consume a lot of resources, and one that could require specialists from several enterprise departments.

SUMMARY OF THE INVENTION

Systems and methods for information lifecycle cross-system reconciliation are described. A number of reconciliation indicators for a certain type of data are defined. A first set of values of the reconciliation indicators are calculated at a first computer system based on data stored in a memory of the first computer system. A second set of values of the reconciliation indicators are calculated at a second computer system based on data transferred from the first computer system. The two sets of values are received at reconciliation cockpit and stored in a reconciliation data structure. Further, the reconciliation data structure is audited to identify inconsistency between the data stored in the memory of the first computer system and the data transferred to the second computer system. If such an inconsistency is identified, the data transfer is reported as inconsistent, and the transferred data in the second computer system is disposed or appropriate measures are triggered to correct the inconsistency. If no inconsistency is identified, the data transfer is confirmed.

These and other benefits and features of embodiments of the invention will be apparent upon consideration of the following detailed description of preferred embodiments thereof, presented in connection with the following drawings.

BRIEF DESCRIPTION OF THE DRAWINGS

The claims set forth the embodiments of the invention with particularity. The invention is illustrated by way of example and not by way of limitation in the figures of the accompanying drawings in which like references indicate similar elements. The embodiments of the invention, together with its advantages, may be best understood from the following detailed description taken in conjunction with the accompanying drawings.

DETAILED DESCRIPTION

Embodiments of techniques for 'Information Lifecycle Cross-System Reconciliation' are described herein. In the following description, numerous specific details are set forth to provide a thorough understanding of embodiments of the invention. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

Reference throughout this specification to "one embodiment", "this embodiment" and similar phrases, means that a particular feature, structure, or characteristic described in connection with the embodiment is included in at least one embodiment of the present invention. Thus, the appearances of these phrases in various places throughout this specification are not necessarily all referring to the same embodiment.

Furthermore, the particular features, structures, or characteristics may be combined in any suitable manner in one or more embodiments.

Information lifecycle or data lifecycle generally refers to a cycle encompassing creation of specific information, processing of this information in various computer systems, and, at the end, disposal of the information when it is no longer needed. For example, financial data is typically created in an ERP system. This data is then entered in an invoice, posted in a general ledger, or kept in some other form within the ERP system, according to the integrated business processes. At certain time, e.g., end-of-period, this data is consolidated in another system with similar data from other ERP systems or from other sources. The data could be consolidated in specific forms or statements, e.g., profit and loss (P&L) statement, balance sheet (BS) and the like. These consolidated statements are used for purposes of reporting to management, for internal or external audits, etc.

Most of the examples in this document involve financial data, but one of ordinary skill in the art will recognize that other kinds of information go through similar transformations. For example, the information lifecycle reconciliation is relevant to other enterprise data generated by logistic systems, supply chain management systems, human capital management systems, etc. Therefore, data lifecycle or information lifecycle is a term that addresses many types of information.

Generally, data transfer is initiated by a user or a system process and involves transporting of specific information from a source application or system to a destination system. There are situations when the transferred data is altered during the transportation. For example, an erroneous extract of the data at the source system may occur, information transportation might suffer from data loss or duplicated data, and other systems could also interfere with the transfer. Typically, the data received at the destination system is compared with the source data in the source system. Such a comparison is often performed manually or with little automation, and requires a lot of resources in order to confirm the accuracy of the data transfer. It is even harder to check the accuracy of a data transfer at the destination system when the transferred data is consolidated with data received from other sources.

Figure 1:
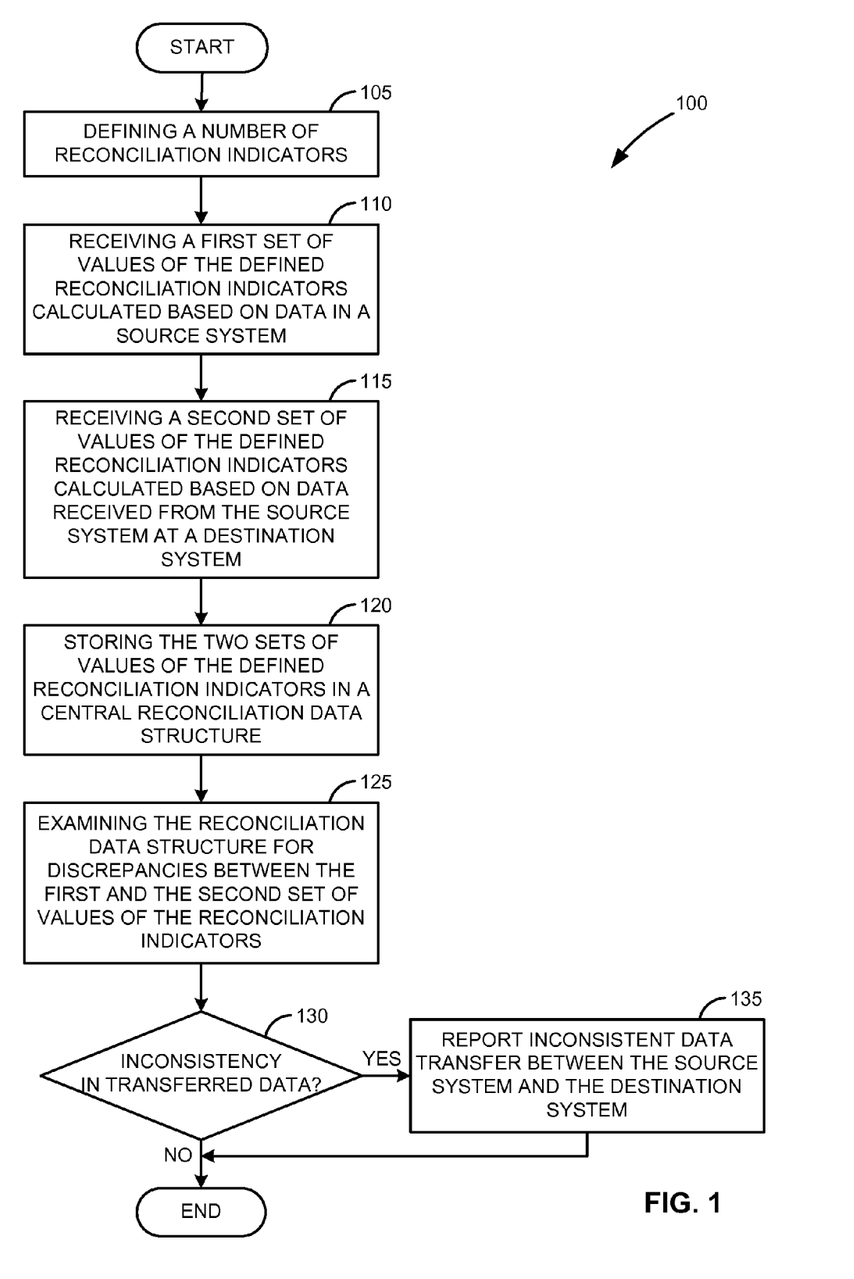
FIG. 1 illustrates a process for reconciliation of data transferred between two computer systems at a central reconciliation cockpit, according to one embodiment of the invention.

FIG. 1 illustrates process 100 for reconciliation of data transferred between a source computer system and a destination computer system, according to one embodiment of the invention. One or more reconciliation indicators are defined in order to optimize the comparison between the data stored in the source system and the data that is received at the destination system at 105. The reconciliation indicators depend on the type of data that is transferred. For financial data, such indicators could be based on total amount of particular accounts at a particular moment; balance sheet total; accounts receivable total; accounts payable total; differences between accounts receivable and accounts payable; etc. More general algorithms for defining reconciliation indicators could also be applied, e.g., hash functions, encryption protocols, digital signatures, etc. Thus, by a comparison of relatively small number of control values corresponding to the predefined reconciliation indicators, the consistency of the transferred data could be confirmed with sufficient level of integrity.

At block 110, a set of values of the reconciliation indicators calculated for the data stored in the source system is received at a reconciliation module, according to one embodiment of the invention. In this document, the reconciliation module is also called reconciliation cockpit. The values could be calculated in the source system. Alternatively, the data necessary for calculating the values could be extracted by a third system, or directly by the reconciliation cockpit. Depending on where the values are calculated, the definitions created at 105 are implemented in the source system, in a third system, or in the reconciliation cockpit, e.g., by a special program, software or hardware agent, or a plug-in. Other combinations to provide the necessary logic for calculating the values of the reconciliation indicators using data stored in the source system are also possible.

At block 115, a set of values of the reconciliation indicators calculated for the data transferred to the destination system is received at the reconciliation cockpit. As with the set of values for the source data, the values of the reconciliation indicators for the received data could be calculated in the destination system, e.g., by a special program, agent or a plug-in. Alternatively, the data necessary for calculating the values could be extracted by a third system, or directly by the reconciliation cockpit. Depending on where the values are calculated, the definitions created at 105 are implemented in the destination system, in a third system, or in the reconciliation cockpit, respectively. Other combinations are possible to provide the necessary logic for calculating the values of the reconciliation indicators using the data received at the destination system.

As a result, after execution of the actions illustrated with blocks 110 and 115 of process 100, two sets of values corresponding to the reconciliation indicators are received at a reconciliation cockpit. One of the sets is calculated using the data stored in the source system, and the other set is calculated using the data received at the destination system. Each of the values of the first and the second sets corresponds to exactly one of the defined reconciliation indicators, according to one embodiment of the invention. At block 120, the two sets of values of the reconciliation indicators are stored in a reconciliation data structure. Depending on the implementation, reconciliation data structure could be a flat file, a tree structure, a table, a number of related tables within a database, etc.

Figure 2:
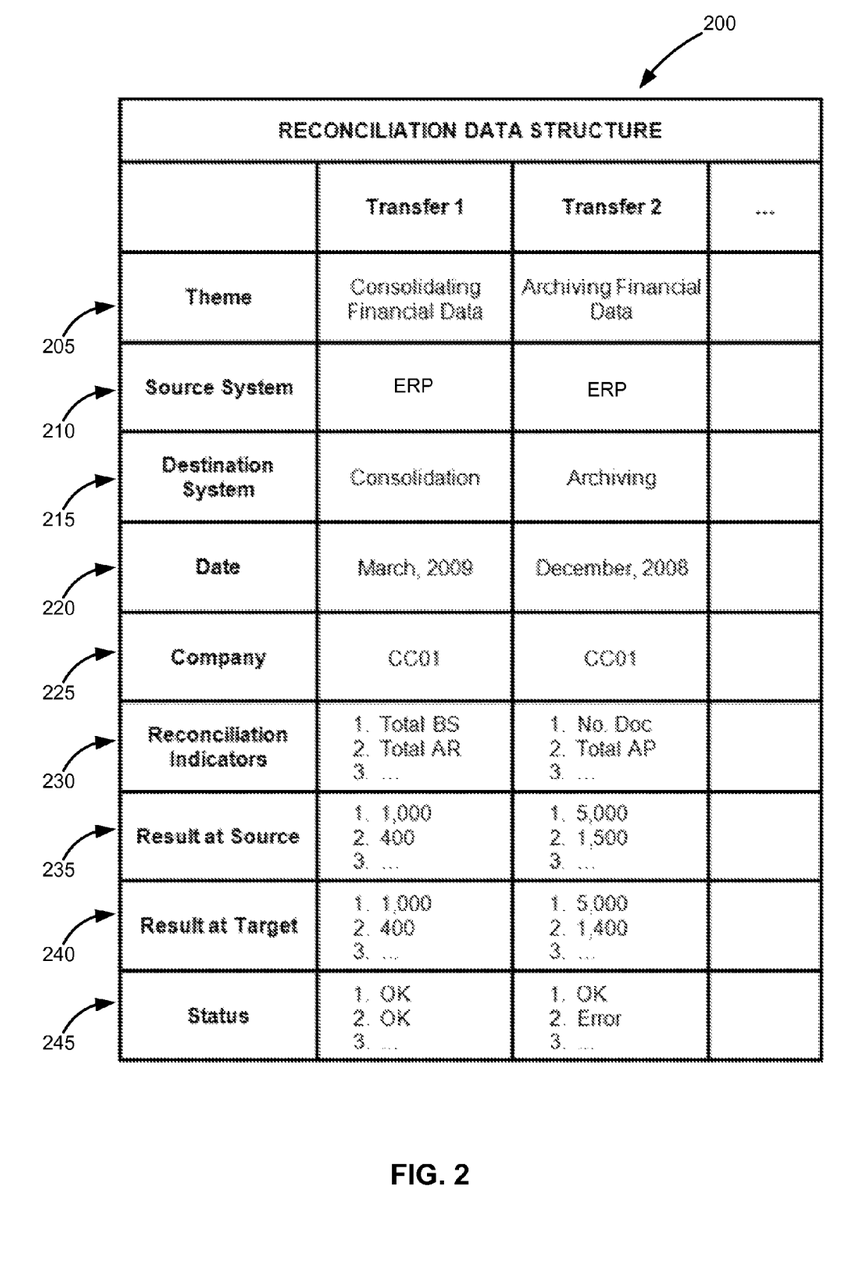
FIG. 2 illustrates a data transfer reconciliation data structure, according to one embodiment of the invention.

FIG. 2 illustrates, by way of a non limiting example, a reconciliation data structure to store the values of the reconciliation indicators, together with additional relevant information, according to one embodiment of the invention. The first column contains captions indicative for the kind of data stored on each row. The rest of the columns correspond to separate transfers of data. For one of ordinary skill in the art it will be obvious that the table could have other structure, and that the table could be transposed in a way where rows and columns switch places.

In table 200, row 205 contains themes, e.g., a name or a short description for each transfer. For example, table 200 includes data for two transfers, where the theme of the first transfer is "Consolidating Financial Data", and the theme of the second transfer is "Archiving Financial Data". Next, row 210 shows the source system where the transferred data is stored and from where the data is extracted and transferred to the destination system. For both transfers included in table 200, the source system is ERP. Row 215 contains the destination system for each transfer. The destination system for the first illustrated transfer is "Consolidation" system, and the destination system for the second illustrated transfer is "Archiving" system. The dates of the registered transfers are provided in row 220. In one embodiment of the invention, row 220 could contain the time of the transfers as well.

The data that is transferred belongs to a particular company or a company unit, according to one embodiment of the invention. A global enterprise could include a number of different companies that operate in a number of different business areas and different countries. Further, a company or an enterprise could be organized in several units. The different companies and company units of an enterprise may run autonomous computer systems and communicate with the rest of the enterprise through dedicated channels. Each company or company unit generates and operates with specific information. A data transfer could be accomplished within a single company or company unit, or could involve more than one company or company unit of an enterprise, or even between enterprises. Row 225 shows to which company, or to which company unit, the transferred data belongs. Each field of this row could include more than one company or unit identifier when the data belongs to more than one company or unit, or when the data is transferred between computer systems that are used by more than one companies or company units. The information stored in row 225 could provide codes of companies of an enterprise, unit codes or codes of cost centers of a company, etc.

The fields of row 230 contain sets of reconciliation indicators defined for each registered transfer. Every single consolidation indicator could be enlisted and described by definition or logic in table 200, according to one embodiment of the invention. For example, two consolidation indicators named "Total BS", i.e., the total of the respective balance sheet; and "Total AR", i.e., the total of the respective accounts receivable are defined for verifying the first transfer. Further, in row 235, the set of values corresponding to the reconciliation indicators 230 that are calculated using data stored in the memory of the source computer system are stored for each transfer. Likewise in row 240, the set of values corresponding to the reconciliation indicators that are calculated using the data received at the destination computer system are stored for each transfer.

The last row 245 of table 200 shows the status of the verification of the each data transfer. In one embodiment of the invention, status of a transfer could show a result of a comparison between a source value and a destination value for every reconciliation indicator. In other scenarios, e.g., when hash functions are applied, the received values could be compared by using an integrated procedure to apply predefined comparison algorithms. When the source value and the destination value of a reconciliation indicator are the same, the status for this indicator is "OK". Otherwise, the status is "Error". As illustrated in table 200, row 245, for the first data transfer the statuses for all reconciliation indicators are "OK", respectively, the transfer is verified and correct. However, for the second transfer there is a discrepancy between the values calculated for "Total AP" reconciliation indicator. An inconsistency is identified between the data stored in the source system and the data received at the destination system. Accordingly, the second data transfer is not correct.

Returning to FIG. 1, the statuses on row 245 of table 200 for a particular data transfer could be generated at 125 automatically by the reconciliation cockpit, or could be evaluated during an auditing process. During this audit, the first set of values of the reconciliation indicators calculated using the data stored at the source computer system, and the second set of values of the reconciliation indicators calculated using the data received at the destination computer system are compared.

The data transfer could be checked or examined for consistency at 130 by scanning the statuses of the reconciliation data structure. When a status shows a discrepancy between the values of a reconciliation indicator at the source and destination systems, it indicates that the transferred data is altered during the transfer, i.e., there is inconsistency in the transferred data. If inconsistency in the transferred data is detected at 130, a report is generated at 135 to inform the interested parties. This report could include all the available information for the transfer that is stored in the reconciliation data structure. The report could be displayed to one or more users. This report could be electronically sent to one or more recipients from the interested parties, printed out for further analysis, etc. In one embodiment of the invention, if an inconsistency in the transferred data is detected at 130, the reconciliation cockpit, or another module, could trigger a full or partial repeat of the data transfer at 135. When there are no discrepancies between the corresponding values of the reconciliation indicators, no inconsistency in the data transfer is detected at 130, and the correctness of the data transfer is confirmed.

Figure 3:
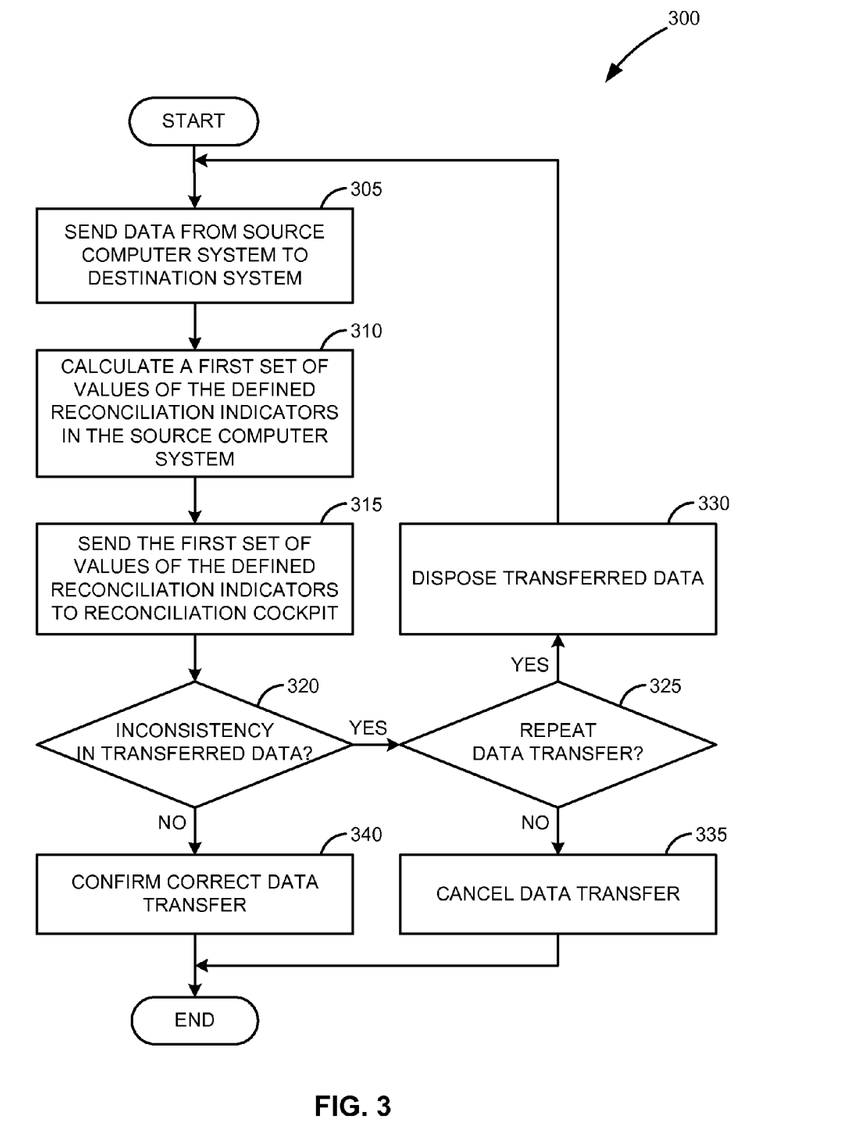
FIG. 3 illustrates a process for reconciliation of data transferred from a first computer system, according to one embodiment of the invention.

FIG. 3 illustrates process 300 for reconciliation of data transfer from a source computer system perspective, according to a further embodiment of the invention. At block 305, process 300 begins with sending data from a source computer system or application to a destination computer system or application. At 310, one or more values corresponding to one or more previously defined reconciliation indicators are calculated in the source system. The values are calculated using the data that is transferred from the source computer system to the destination computer system. At 315, the calculated values are sent to a reconciliation cockpit, or a similar central system module or application. The values are stored in a reconciliation data structure in the reconciliation cockpit or in the similar module or application. To verify the data transfer transaction, the values of the reconciliation indicators are compared with corresponding values calculated by using the data received at the destination system. Blocks 305 and 310 could be accomplished in reverse order or simultaneously in an embodiment of the invention.

The consistency of the data transfer is checked at 320. This check could be performed by the reconciliation cockpit, as illustrated with block 130 in FIG. 1. Alternatively, another application could audit the values of the reconciliation indicators stored in a reconciliation data structure. In a further embodiment of the invention, an agent or a plug-in to the source computer system could check the consistency of the data transfer. The source system could access reconciliation data structure, and compare the stored values of the reconciliation indicators. Alternatively, the source system could access the reconciliation data structure and read the status information for the data transfer transaction.

If the data transfer is inconsistent, e.g., discrepancies are found between the corresponding values of the reconciliation indicators, the data transfer could be repeated or cancelled. At block 325, it is decided whether the data transfer will be repeated or cancelled. If repeated, transferred data could be disposed at 330, and process 300 is started anew. Otherwise, data transfer is cancelled at 335. If the data transfer is consistent, e.g., the data received at the destination computer system is identical with the data sent from the source computer system, the data transfer is confirmed as correct at 340. After the consistency of the data transfer is confirmed, the data stored in the source system could be disposed or deleted. Thus, the persistency of the transferred data will be moved to the destination computer system.

Figure 4:
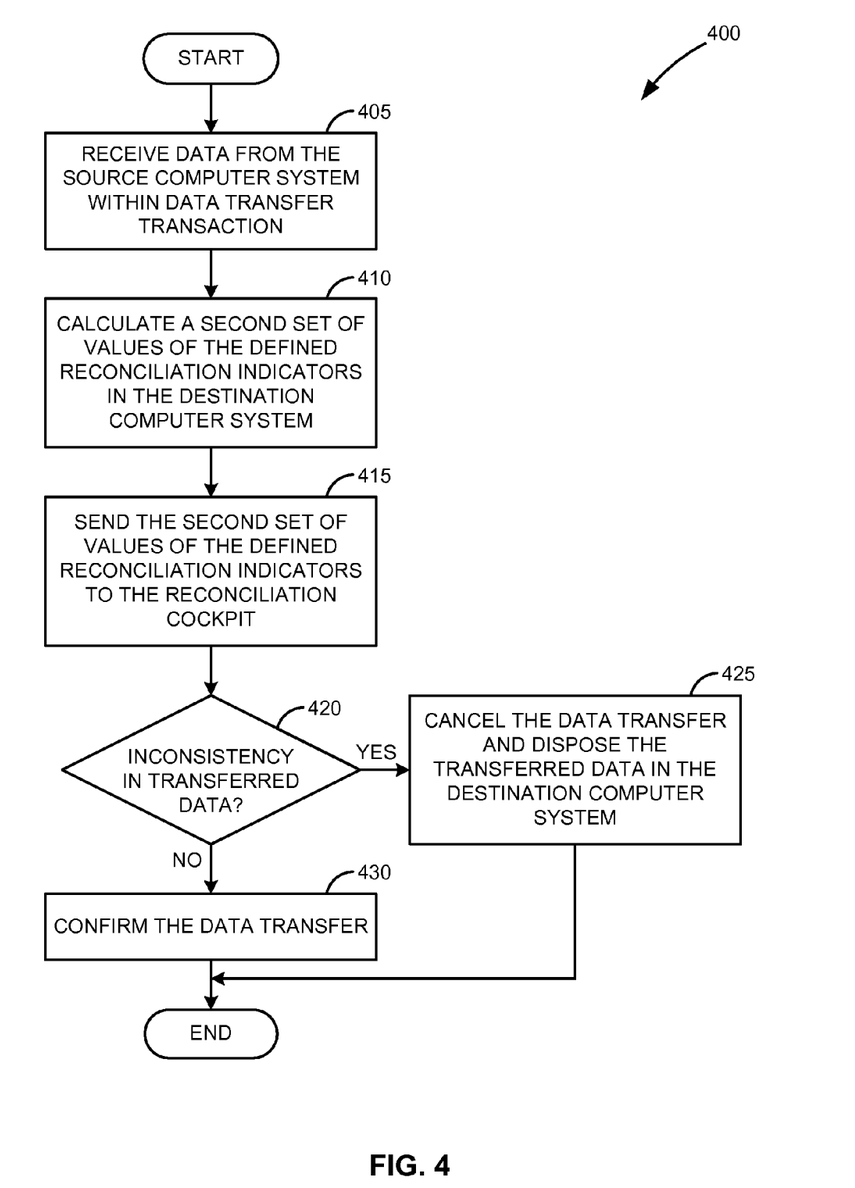
FIG. 4 illustrates a process for reconciliation of data transferred to a second computer system, according to one embodiment of the invention.

FIG. 4 illustrates process 400 for reconciliation of data transfer from a destination computer system perspective, according to a further embodiment of the invention. At 405, data transferred from a source computer system is received at a destination computer system. At 410, the received data is used for calculation of value or values for one or more predefined reconciliation indicators. At 415, the calculated value or values are sent to a reconciliation cockpit or similar module or application to be stored in a reconciliation data structure for further analysis. Reconciliation data structure also holds value or values calculated for the one or more reconciliation indicators using the original data stored in the source computer system.

At block 420, the values of the reconciliation indicators calculated using the data received at the destination system are compared with the corresponding values of the reconciliation indicators calculated using the data stored in the source system. This comparison could be accomplished within the reconciliation cockpit application or in other computer application or system. If discrepancies between the corresponding values are found, there is inconsistency in the transferred data. Inconsistency in the transferred data means that the data that is transferred (received at the destination) is inconsistent with the original data. In such a case, the data transfer is cancelled at block 425. It is possible with the help of reconciliation indicators or other tools, the part of the transferred data that is inconsistent to be identified, and respectively, only this part of the data transfer to be cancelled. When all or part of the data received at the destination system is not identical with the data stored in the source system, it could be wholly or partially removed, and re-transferred, according to one embodiment of the invention. If the consistency of the data transfer is confirmed at block 420, e.g., no discrepancy between the corresponding values of the reconciliation indicators are found, the data received at the destination system is identical with the data stored in the source system. In such a case, the data transfer transaction is confirmed at 430, e.g., the transfer of data is successfully accomplished.

The actions described in reference to processes 100, 300 and 400 could take place in at least three different computer systems, e.g., a source computer system, a destination computer system and a reconciliation cockpit, according to further embodiments of the invention. In another embodiment of the invention, some of the described actions could be accomplished by different computer systems, whether specified or not. For example, reconciliation cockpit could be implemented in either the source computer system or the destination computer system. In general, data transfer is independent from the reconciliation procedure and already accomplished data transfers could be verified using the described approach.

Figure 5:
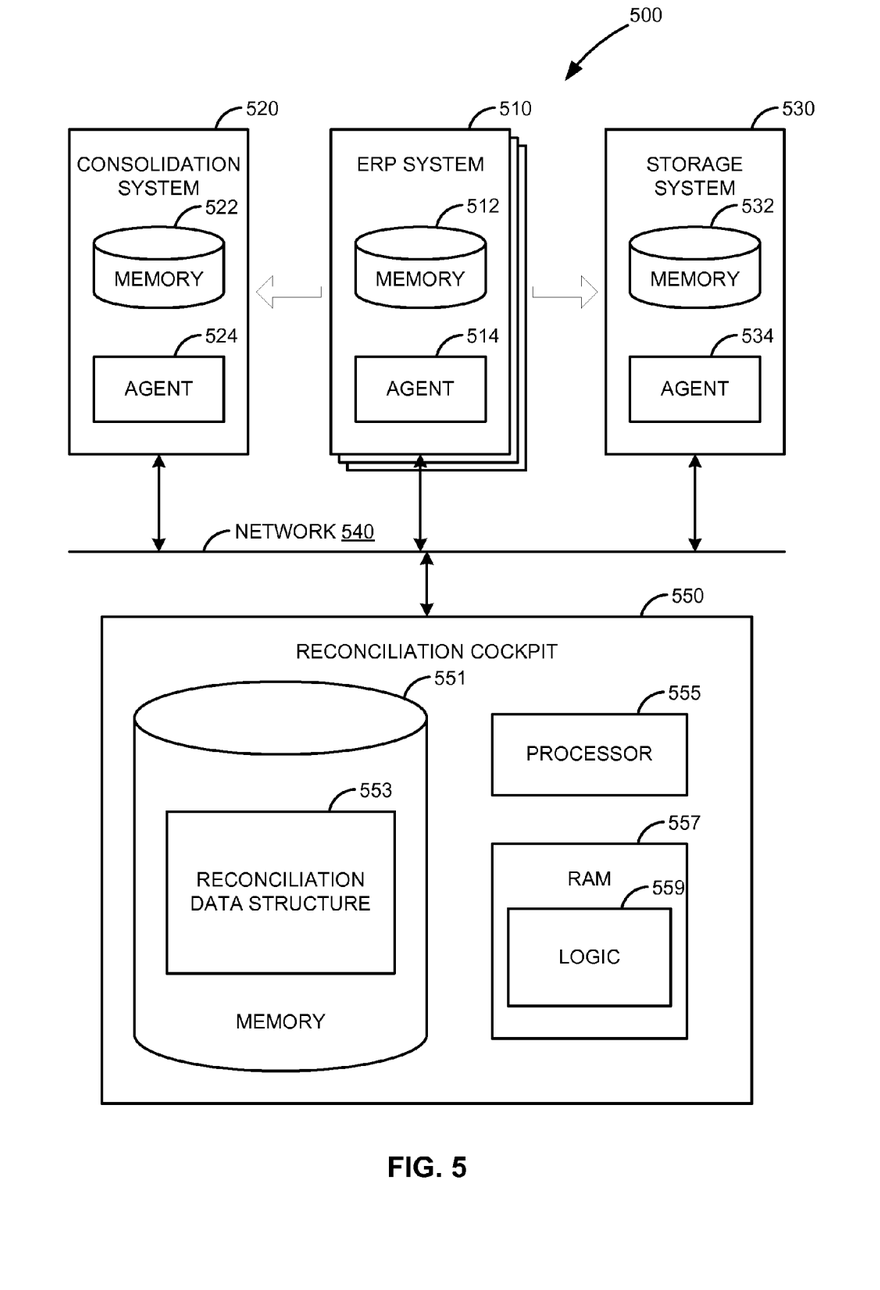
FIG. 5 is a block diagram of an exemplary system for reconciliation of data transfer between computer systems, according to one embodiment of the invention.

FIG. 5 shows by way of example a block diagram of system 500 for reconciliation of data transfer between computer systems, according to one embodiment of the invention. In this example, of an enterprise environment, system 500 includes enterprise resource planning (ERP) system 510, consolidation system 520, storage system 530, and reconciliation cockpit 550. All elements of system 500 are interconnected by network 540 that could be any kind of wire or wireless computer network. In a configuration as illustrated in FIG. 5, data is typically generated in ERP system 510. In a further embodiment of the invention, ERP system 510 automates the business processes of a company or of a company unit. System 500 could include a number of ERP systems 510 within a multi-company enterprise environment. The data generated by a company or a company unit is sent from ERP system 510 to consolidation system 520 for further processing. Consolidation system 520 collects data from various systems, including other ERP systems 510 that automate business processes for other companies in the enterprise. The data generated in ERP system 510 is also sent to storage system 530 for archiving.

ERP system 510, consolidation system 520 and storage system 530 contain memory 512, 522 and 532, respectively. According to a further embodiment of the invention, the data that is generated in ERP system 510 is stored in memory 512. The data stored in memory 512 is transferred to consolidation system 520 and stored in memory 522. Similarly, the data stored in memory 512 is transferred to storage system, where it is stored in memory 532. In order to confirm consistency between the original data stored in memory 512 of ERP system 510 and the data received at consolidation system 520 or at storage system 530, agents 514, 524 and 534, respectively, calculate values of one or more predefined reconciliation indicators. Agent 514 calculates the respective values by using the data that is stored in memory 512. Agents 524 and 534 calculate the respective values by using the data received at consolidation system 520 and at storage system 530, accordingly. The calculated values are sent to reconciliation cockpit 550, and stored in reconciliation data structure 553 in memory 551.

The reconciliation data structure is examined in order to identify discrepancies between the corresponding values of the reconciliation indicators received from agent 514; and agent 524 or agent 534, depending on whether the destination system of the data transfer transaction is the consolidation system 520 or the storage system 530, respectively. If such discrepancies are found, there is inconsistency between the data stored in memory 512 of ERP system 510 and the same data transferred from ERP system 510, and received at consolidation system 520 or at storage system 530. If no discrepancies are identified in reconciliation data structure 553, consistency of the transfer of data between ERP system 510, and consolidation system 520 or archive system 530 is confirmed.

In another embodiment of the invention, agents 514, 524 and 534 do not calculate values of the defined reconciliation indicators. Instead, agent 514, extract data from memory 512 in ERP system 510; agent 524 extracts data received from ERP system 510 at consolidation system 520; and agent 534 extracts data received from ERP system 510 at storage system 530, respectively. The extracted data is sent to reconciliation cockpit 550. The reconciliation indicators for source and destination systems are calculated in reconciliation cockpit 550 based on the extracted data, and stored in reconciliation data structure 553 for further analysis.

Reconciliation cockpit 550 further includes processor 555, dynamic memory (random access memory—RAM) 557, and logic 559 stored in RAM 557. Logic 559 provides instructions to processor 555, according to one embodiment of the invention. Processor 555 executes the instructions of logic 559 in order to provide the functionality necessary to reconcile a data transfer between a source system, e.g., ERP system 510, and a destination system, e.g., consolidation system 520 or storage system 530.

Systems and methods consistent with the present invention also include computer readable media that include program instruction or code for performing various computer-implemented operations based on the methods and processes of the invention. The media and program instructions may be those specially designed and constructed for the purposes of the invention, or they may be of the kind well known and available to those having skill in the computer software arts. Examples of program instructions include, for example, machine code, such as produced by a compiler, and files containing a high level code that can be executed by the computer using an interpreter. In this document, the meaning of the term "computer readable media" is limited to an article of manufacture for tangibly storing computer-readable instructions.

Figure 6:
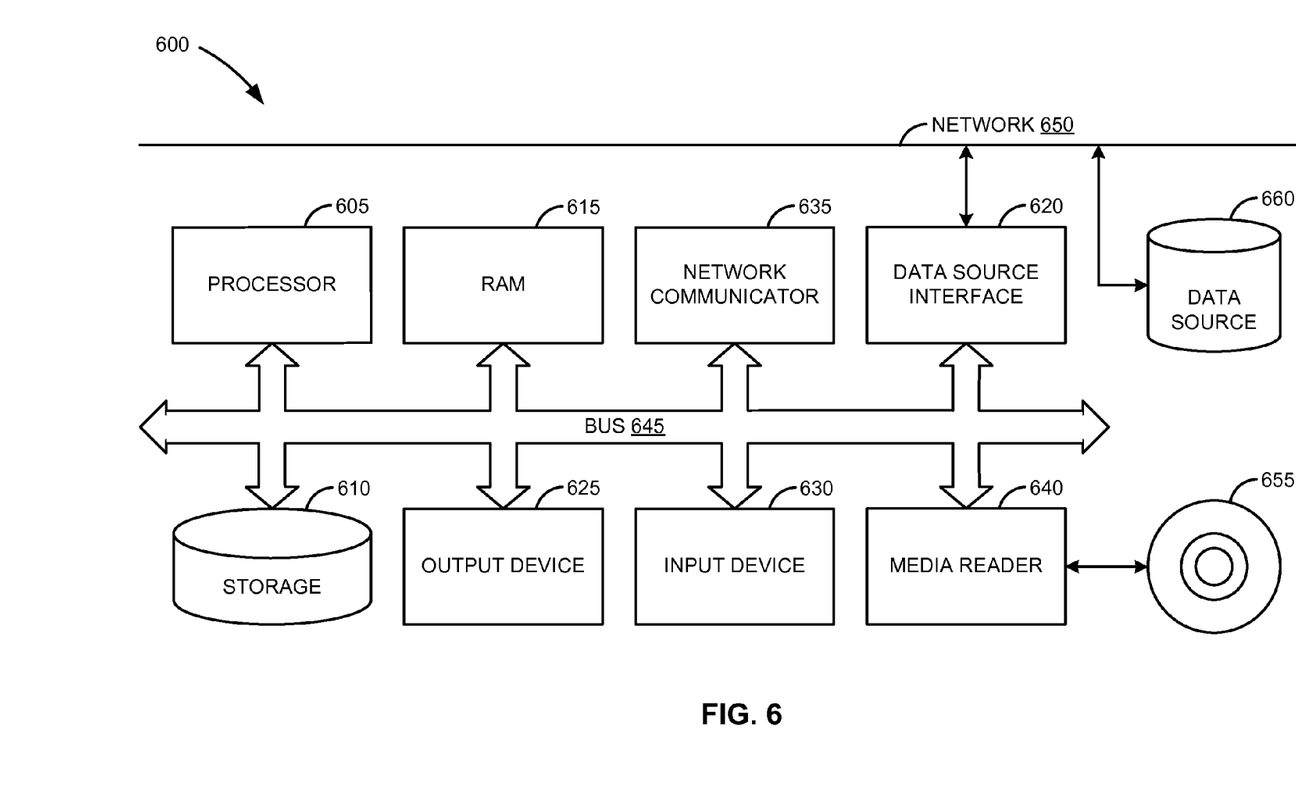
FIG. 6 is a block diagram of an exemplary computer system to execute computer readable instructions for data lifecycle cross-system reconciliation, according to one embodiment of the invention.

FIG. 6 is a block diagram of an exemplary computer system 600. The computer system 600 includes a processor 605 that executes software instructions or code stored on a computer readable medium 655 to perform the above-illustrated methods of the invention. The computer system 600 includes a media reader 640 to read the instructions from the computer readable medium 655 and store the instructions in storage 610 or in random access memory (RAM) 615. The storage 610 provides a large space for keeping static data where at least some instructions could be stored for later execution. The stored instructions may be further compiled to generate other representations of the instructions and dynamically stored in the RAM 615. The processor 605 reads instructions from the RAM 615 and performs actions as instructed. According to one embodiment of the invention, the computer system 600 further includes an output device 625 (e.g., a display) to provide at least some of the results of the execution as output including, but not limited to, visual information to users and an input device 630 to provide a user or another device with means for entering data and/or otherwise interact with the computer system 600. Each of these output 625 and input devices 630 could be joined by one or more additional peripherals to further expand the capabilities of the computer system 600. A network communicator 635 may be provided to connect the computer system 600 to a network 650 and in turn to other devices connected to the network 650 including other clients, servers, data stores, and interfaces, for instance. The modules of the computer system 600 are interconnected via a bus 645. Computer system 600 includes a data source interface 620 to access data source 660. The data source 660 can be access via one or more abstraction layers implemented in hardware or software. For example, the data source 660 may be access by network 650. In some embodiments the data source 660 may be accessed via an abstraction layer, such as, a semantic layer.

A data source is an information resource. Data sources include sources of data that enable data storage and retrieval. Data sources may include databases, such as, relational, transactional, hierarchical, multi-dimensional (e.g., OLAP), object oriented databases, and the like. Further data sources include tabular data (e.g., spreadsheets, delimited text files), data tagged with a markup language (e.g., XML data), transactional data, unstructured data (e.g., text files, screen scrapings), hierarchical data (e.g., data in a file system, XML data), files, a plurality of reports, and any other data source accessible through an established protocol, such as, Open DataBase Connectivity (ODBC), produced by an underlying software system (e.g., ERP system), and the like. Data sources may also include a data source where the data is not tangibly stored or otherwise ephemeral such as data streams, broadcast data, and the like. These data sources can include associated data foundations, semantic layers, management systems, security systems and so on.

Some embodiments of the invention may include the above-described methods being written as one or more software components. These components, and the functionality associated with each, may be used by client, server, distributed, or peer computer systems. These components may be written in a computer language corresponding to one or more programming languages such as, functional, declarative, procedural, object-oriented, lower level languages and the like. They may be linked to other components via various application programming interfaces and then compiled into one complete application for a server or a client. Alternatively, the components maybe implemented in server and client applications. Further, these components may be linked together via various distributed programming protocols. Some example embodiments of the invention may include remote procedure calls being used to implement one or more of these components across a distributed programming environment. For example, a logic level may reside on a first computer system that is remotely located from a second computer system containing an interface level (e.g., a graphical user interface). These first and second computer systems can be configured in a server-client, peer-to-peer, or some other configuration. The clients can vary in complexity from mobile and handheld devices, to thin clients and on to thick clients or even other servers.

The above-illustrated software components are tangibly stored on a computer readable medium as instructions. The term "computer readable medium" should be taken to include a single medium or multiple media that stores one or more sets of instructions. The term "computer readable medium" should be taken to include any physical article that is capable of undergoing a set of physical changes to physically store, encode, or otherwise carry a set of instructions for execution by a computer system which causes the computer system to perform any of the methods or process steps described, represented, or illustrated herein. Examples of computer-readable media include, but are not limited to: magnetic media, such as hard disks, floppy disks, and magnetic tape; optical media such as CD-ROMs, DVDs and holographic devices; magneto-optical media; and hardware devices that are specially configured to store and execute, such as application-specific integrated circuits ("ASICs"), programmable logic devices ("PLDs") and ROM and RAM devices. Examples of computer readable instructions include machine code, such as produced by a compiler, and files containing higher-level code that are executed by a computer using an interpreter. For example, an embodiment of the invention may be implemented using Java, C++, or other object-oriented programming language and development tools. Another embodiment of the invention may be implemented in hard-wired circuitry in place of, or in combination with machine readable software instructions.

The above descriptions and illustrations of embodiments of the invention, including what is described in the Abstract, is not intended to be exhaustive or to limit the invention to the precise forms disclosed. While specific embodiments of, and examples for, the invention are described herein for illustrative purposes, various equivalent modifications are possible within the scope of the invention, as those skilled in the relevant art will recognize. These modifications can be made to the invention in light of the above detailed description. Rather, the scope of the invention is to be determined by the following claims, which are to be interpreted in accordance with established doctrines of claim construction.

What is claimed is:

1. An article of manufacture having computer readable instructions stored thereon for execution by a processor to perform a method for data transfer reconciliation, the method comprising:

receiving via a computer network a first set of values of a plurality of reconciliation indicators calculated based on data stored in a memory of a source computer system by an agent at the source computer system according to a definition of the plurality of reconciliation indicators;

receiving via the computer network a second set of values of the plurality of reconciliation indicators calculated based on data received at a destination computer system, wherein the received data is transferred from the source computer system;

storing the first set of values and the second set of values of the plurality of reconciliation indicators in a memory within a reconciliation data structure;

arranging the first and the second set of values of the plurality of reconciliation indicators among a plurality of stored reconciliation indicators based on two or more factors selected from a group consisting of:

a data transfer identifier,
a period of time relative to the transferred data,
an enterprise unit,
the source computer system, and
the destination computer system; and
examining the reconciliation data structure for discrepancies between the first set of values and the second set of values of the plurality of reconciliation indicators to confirm a consistency or to identify an inconsistency between the data stored in the memory of the source computer system and the data received at the destination computer system.

2. The article of manufacture of claim 1 having computer readable instructions stored thereon for execution by a processor to perform a method for data transfer reconciliation, the method further comprising:
defining the plurality of reconciliation indicators dependent on a type of the data that is transferred.

3. The article of manufacture of claim 2, wherein defining the plurality of reconciliation indicators comprises:
defining the plurality of reconciliation indicators to represent financial information at an end-of-period cycle.

4. The article of manufacture of claim 1, wherein receiving the first set of values of the plurality of reconciliation indicators comprises:
extracting data stored in a memory of the source computer system; and
processing the extracted data according to the definition of the plurality of reconciliation indicators.

5. The article of manufacture of claim 1, wherein examining the reconciliation data structure further comprises:
comparing the first set of values of the plurality of reconciliation indicators with the second set of values of the plurality of reconciliation indicators using an integrated procedure to apply predefined comparison algorithms; and
assigning a status of the comparison between the first set of values and the second set of values for each reconciliation indicator of the plurality of reconciliation indicators, wherein the status is indicating correct or erroneous data transfer between the computer systems.

6. The article of manufacture of claim 1 having computer readable instructions stored thereon for execution by a processor to perform a method for data transfer reconciliation, the method further comprising:
cancelling a data transfer transaction and initiating a disposal of transferred data at the destination computer system when the inconsistency is identified.

7. A computer system for data transfer reconciliation comprising:
a reconciliation cockpit comprising:
a reconciliation data structure to store a first set of values of a plurality of reconciliation indicators for a source computer system calculated by an agent at the source computer system according to a definition of the plurality of reconciliation indicators, and a second set of values of the plurality of reconciliation indicators for a destination computer system, wherein the first set of values and the second set of values of the plurality of reconciliation indicators are calculated based on data transferred from the source computer system to the destination computer system,
a dynamic memory to store instructions for examining the reconciliation data structure for discrepancies between the first set of values and the second set of values of the plurality of reconciliation indicators, and
a processor to execute the instructions stored in the dynamic memory to
compare the first set of values of the plurality of reconciliation indicators with the second set of values of the plurality of reconciliation indicators using an integrated procedure to apply a predefined comparison algorithm, and
assign a status of the comparison between the first and to the second sets of values for each of the plurality of reconciliation indicators, the status is indicating correct or erroneous data transfer between the computer systems.

8. The computer system of claim 7, wherein the reconciliation cockpit comprises:
an agent to calculate the first set of values of the plurality of reconciliation indicators based on data extracted from a memory of the source computer system.

9. The computer system of claim 7, wherein the reconciliation cockpit comprises:
an agent to calculate the second set of values of the plurality of reconciliation indicators based on data extracted from the destination computer system.

10. The computer system of claim 7, wherein the dynamic memory comprises:
a logic to be executed by the processor to compare the first set of values of the plurality of reconciliation indicators and the second set of values of the plurality of reconciliation using an integrated procedure to apply predefined comparison algorithms.

11. A computer implemented method for data transfer reconciliation, the method comprising:
receiving via a computer network a first set of values of a plurality of reconciliation indicators based on data stored in a memory of a source computer system, the first set of values of the plurality of reconciliation indicators calculated by an agent at the source computer system according to a definition of the plurality of reconciliation indicators;
receiving via the computer network a second set of values of the plurality of reconciliation indicators based on data received at a destination computer system, is the data is transferred from the source computer system;
storing the first set of values and the second set of values of the plurality of reconciliation indicators in a memory within a reconciliation data structure;
arranging the first and the second set of values of the plurality of reconciliation indicators among a plurality of stored reconciliation indicators based on two or more factors selected from a group consisting of:
a data transfer identifier,
a period of time relative to the transferred data,
an enterprise unit,
the source computer system, and
the destination computer system; and
examining the reconciliation data structure for discrepancies between the first set of values and the second set of values of the plurality of reconciliation indicators to confirm a consistency or to identify an inconsistency between the data stored in the memory of the source computer system and the data received at the destination computer system.

12. The method of claim 11 further comprising:
defining the plurality of reconciliation indicators to represent financial information at an end-of-period cycle of an enterprise unit.

13. The method of claim 11, wherein defining the plurality of reconciliation indicators comprises:

selecting a reconciliation indicator of the plurality of reconciliation indicators from a group consisting of:
    total of balance sheet,
    total of open account receivables,
    total of open account payables, and
    profit and loss totals.

14. The method of claim 11, wherein receiving the first set of values of the plurality of reconciliation indicators comprises:
    receiving data stored in a memory of the source computer system; and
    processing the received data according to the definition of the plurality of reconciliation indicators.

15. The method of claim 11, wherein examining the reconciliation data structure further comprises:
    comparing the first set of values of the plurality of reconciliation indicators with the second set of values of the plurality of reconciliation indicators using an integrated procedure to apply predefined comparison algorithms; and
    assigning a status of the comparison between the first and to the second sets of values for each of the plurality of reconciliation indicators, the status is indicating correct or erroneous data transfer between the computer systems.

16. The method of claim 11 further comprising:
cancelling a data transfer transaction and initiating a disposal of transferred data at the destination computer system when the inconsistency is identified.

* * * * *